US012607058B2

(12) United States Patent
Chung

(10) Patent No.: US 12,607,058 B2
(45) Date of Patent: Apr. 21, 2026

(54) CABLE TENSIONER AND WINDOW LIFTING DEVICE HAVING THE SAME

(71) Applicants:HSIN CHONG MACHINERY WORKS CO. LTD., Taoyuan City (TW); FUZHOU MINGFANG AUTOMOBILE PARTS INDUSTRY CO., LTD., Fuzhou (CN)

(72) Inventor: Yi-Hsuan Chung, Taoyuan City (TW)

(73) Assignees: HSIN CHONG MACHINERY WORKS CO. LTD., Taoyuan City (TW); FUZHOU MINGFANG AUTOMOBILE PARTS INDUSTRY CO., LTD., Fuzhou (CN)

( * ) Notice: Subject to any disclaimer, the term of this patent is extended or adjusted under 35 U.S.C. 154(b) by 0 days.

(21) Appl. No.: 18/886,489

(22) Filed: Sep. 16, 2024

(65) Prior Publication Data

US 2026/0078623 A1      Mar. 19, 2026

(51) Int. Cl.
*E05F 15/689*          (2015.01)
*E05F 11/48*           (2006.01)
*F16C 1/22*            (2006.01)

(52) U.S. Cl.
CPC ........ *E05F 15/6911* (2024.01); *E05F 11/485* (2013.01); *F16C 1/226* (2013.01); *Y10T 74/2045* (2015.01)

(58) Field of Classification Search
CPC .................................................. E05F 15/6911
See application file for complete search history.

(56) References Cited

U.S. PATENT DOCUMENTS

| | | | |
|---|---|---|---|
| 5,746,094 A | 5/1998 | Medebach et al. | |
| 7,325,360 B2 | 2/2008 | Mazouzi et al. | |
| 8,215,202 B2 | 7/2012 | Tomandl | |
| 10,151,339 B2 * | 12/2018 | Huang .................. | E05F 11/483 |
| 2004/0262442 A1 | 12/2004 | Mazouzi et al. | |
| 2025/0243705 A1 * | 7/2025 | Fu ....................... | E05F 15/6909 |

FOREIGN PATENT DOCUMENTS

| | | |
|---|---|---|
| CN | 221277531 U | 7/2024 |
| DE | 102020214739 A1 | 5/2022 |

* cited by examiner

*Primary Examiner* — Marcus Menezes
(74) *Attorney, Agent, or Firm* — HDLS IPR SERVICES; Chun-Ming Shih

(57)          ABSTRACT

This disclosure is directed to a cable tensioner having a regulating stick, a tube assembly and a spring. The regulating stick has an abutting portion and a ratchet strip. The ratchet strip has multiple ratcheting notches having a stop surface and a slope opposite to each other. The tube assembly sleeving the regulating stick has an outer cylinder and an inner cylinder. The outer cylinder has A second abutting portion and a pawl. The pawl has an elastic arm and a hook portion. The hook portion has a stopping side abutting against the stop surface. The hook portion engages one of the ratcheting notches. The spring is preloaded and clamped between the first and second abutting portions. One end of the inner cylinder abuts a side of the hook portion opposite to the stopping side.

20 Claims, 12 Drawing Sheets

CABLE TENSIONER AND WINDOW LIFTING DEVICE HAVING THE SAME

BACKGROUND OF THE INVENTION

Technical Field

This disclosure is directed to a cable tensioner, in particular to a window lifting device having the cable tensioner and cable tensioner with a reinforced pawl structure.

Description of Related Art

A window lifting device is an accessory commonly disposed on the vehicle door. The window lifting device is used for pulling a window glass up or down via a cable, so that a person in the vehicle may operate the window lifting device to open or close the window. However, the cable may be loose after operation for a long period, and this may lead to an operation failure or delay when opening or closing the window.

Accordingly, the window lifting device is generally provided with a cable tensioner for tightening the cable by a motion caused by a cylinder inserted with a regulating stick and cooperated with a spring. The cylinder is fixed with the regulating stick at a relative position via snapping performed by a pawl and a ratchet rack. However, the cable withstands a strong force in an operation of the window lifting device, and the pawl is therefore nondurable and easily broken. An operation failure of the cable tensioner may be caused by the broken pawl.

In views of this, in order to solve the above disadvantage, the inventor studied related technology and provided a reasonable and effective solution in this disclosure.

SUMMARY OF THE INVENTION

This disclosure is directed to a cable tensioner with a reinforced pawl structure.

This disclosure is directed to a cable tensioner, having a regulating stick, a tube assembly and a spring. The regulating stick has a first abutting portion and a ratchet rack, the ratchet rack has a plurality of ratcheting notches, and each of the ratcheting notches has a stopping surface and a slope disposed therein and opposite to each other. The tube assembly sleeves the regulating stick. The tube has an outer cylinder, and an inner cylinder (240) disposed in the outer cylinder. A second abutting portion is configured on an external surface of the outer cylinder, a pawl is arranged on the outer cylinder. The pawl has an elastic arm and a hook portion, the hook portion is arranged on the elastic arm. The hook portion has a stopping side, the stopping side abuts against the stopping surface, and the hook portion snaps one of the ratcheting notches. The spring sleeves the outer cylinder and is clamped between the first abutting portion and the second abutting portion with preload. The hook portion snapping on the slope of the ratcheting notch is moved to snap on the stopping surface of another of the ratcheting notches via the stopping side when the regulating stick is outstretched from the tube assembly. The inner cylinder has an end abutting against a side of the hook portion opposite to the stopping side.

In one embodiment, the regulating stick has a holding slot extended along a circumferential direction of the regulating stick, and the outer cylinder has a tenon for snapping into the holding slot to fix the regulating stick and the tube assembly along a longitudinal direction of the tube assembly. The holding slot has an opening, and the regulating stick and the tube assembly are relatively movable when the tenon leaves the holding slot through the opening.

In one embodiment, the holding slot has an end disposed with the opening.

In one embodiment, the opening has an opening direction disposed along a longitudinal direction of the regulating stick.

In one embodiment, the opening has an opening direction disposed along the circumferential direction of the regulating stick.

In one embodiment, the inner cylinder sleeves the regulating stick.

In one embodiment, t the ratchet rack is recessed from an external surface of the regulating stick, an installation surface is defined on the external surface of the regulating stick, and the installation surface is parallel to a longitudinal direction of the ratchet rack and extended to beyond two ends of the ratchet rack. The regulating stick has a plurality of ratchet racks and a plurality of installation surfaces, the ratchet racks are serially disposed along a circumferential direction of the regulating stick, wherein one of the installation surfaces is disposed between one of the ratchet racks and another of the ratchet racks adjacent thereto.

In one embodiment, the pawl is integrally formed on the outer cylinder as one piece.

In one embodiment, the regulating stick has an end provided with a protrusion, and the first abutting portion is disposed on the protrusion.

This disclosure is directed to a window lifting device having a regulating stick, an outer cylinder, a spring and an actuator. The regulating stick having a first abutting portion and a ratchet rack, the ratchet rack having a plurality of ratcheting notches, and each of the ratcheting notches having a stopping surface and a slope disposed therein and opposite to each other. The sheathing the regulating stick, having a second abutting portion arranged on an external surface of the outer cylinder, a pawl having an elastic arm and a hook portion arranged on the elastic arm, the hook portion having a stopping side, the stopping side abutting against the stopping surface, and the hook portion snapping one of the ratcheting notches; The spring sheathing the outer cylinder and clamped between the first abutting portion and second abutting portion the with preload. The actuator having a housing, the housing having an inner cylinder, and the inner cylinder inserted in the outer cylinder. the hook portion snapping on the slope of the ratcheting notch is moved to snap on the stopping surface of another of the ratcheting notches via the stopping side when the regulating stick is stretched out the outer cylinder, and the inner cylinder has an end abutting against a side of the hook portion opposite to the stopping side.

In one embodiment, the regulating stick has a holding slot extended along a circumferential direction of the regulating stick, and the outer cylinder has a tenon for snapping into the holding slot to fix the regulating stick and the tube assembly along a longitudinal direction of the tube assembly.

In one embodiment, the holding slot has an opening, and the regulating stick and the tube assembly are relatively movable when the tenon leaves the holding slot through the opening.

In one embodiment, the holding slot has an end disposed with the opening.

In one embodiment, the opening has an opening direction disposed along a longitudinal direction of the regulating stick.

In one embodiment, the opening has an opening direction disposed along the circumferential direction of the regulating stick.

In one embodiment, the inner cylinder sleeves the regulating stick.

In one embodiment, the ratchet rack is recessed from an external surface of the regulating stick, an installation surface is defined on the external surface of the regulating stick, and the installation surface is parallel to a longitudinal direction of the ratchet rack and extended to beyond two ends of the ratchet rack. The regulating stick has a plurality of ratchet racks and a plurality of installation surfaces, the ratchet racks are serially disposed along a circumferential direction of the regulating stick, wherein one of the installation surfaces is disposed between one of the ratchet racks and another of the ratchet racks adjacent thereto.

In one embodiment, the pawl is integrally formed on the outer cylinder as one piece.

In one embodiment, the regulating stick has an end provided with a protrusion, and the first abutting portion is disposed on the protrusion.

In one embodiment, the inner cylinder is one-piece formed with the housing.

According to the cable tensioner and the window lifting device of this disclosure, the regulating rod may be operated to cooperate with the outer cylinder for relative extension or contraction to tighten the cable. A pawl is arranged on the outer cylinder for snapping on the ratchet rack of the regulating stick and the outer cylinder, the outer cylinder is provided with the inner cylinder disposed therein for supporting the pawl so at to prevent the pawl from break caused by a force from the tightened cable.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Detailed descriptions and technical contents of this disclosure is described in the flowing paragraph with reference to the drawings. However, the drawings are attached only for illustration and are not intended to limit this disclosure.

Figure 1:
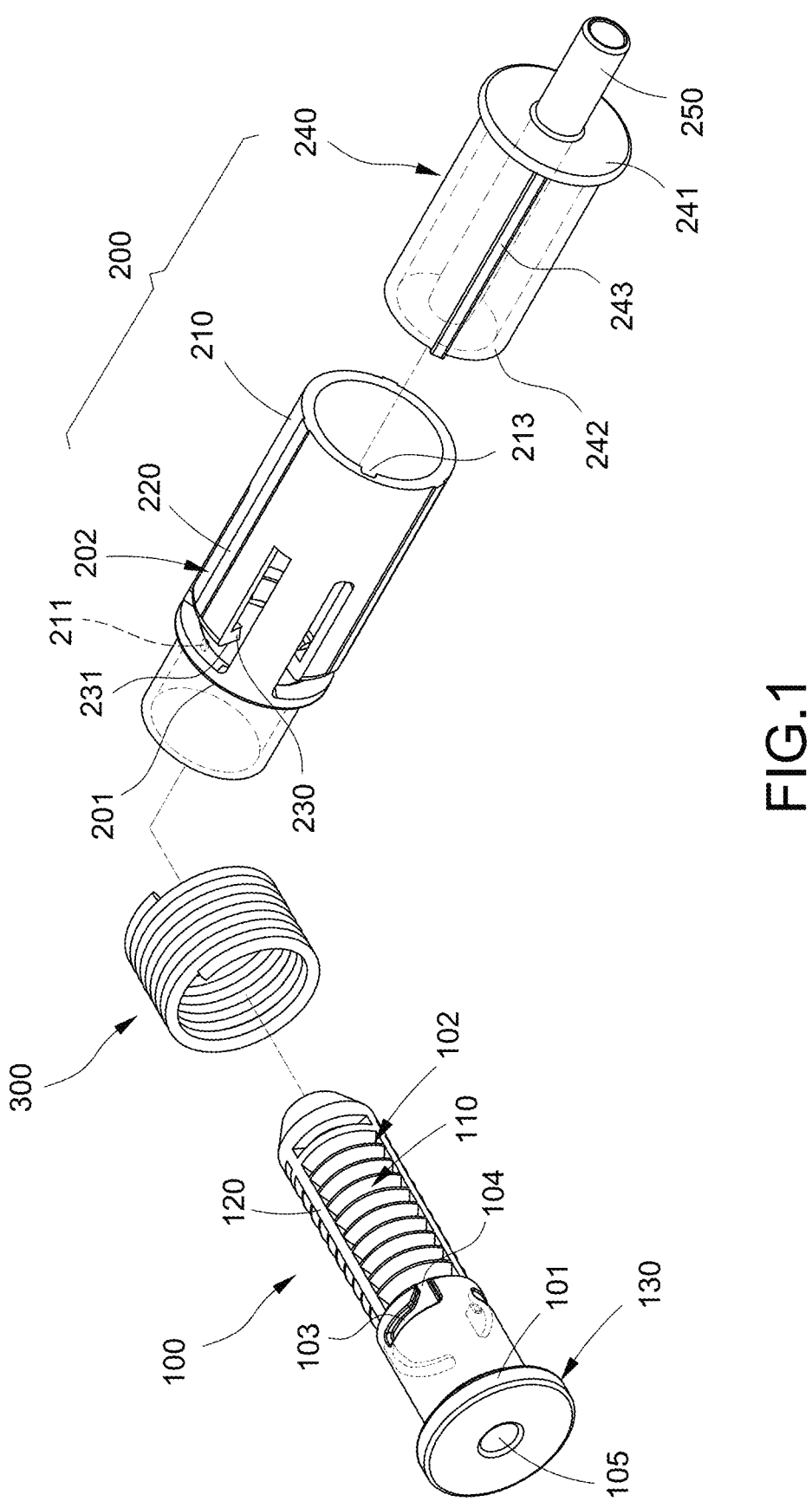
FIG. 1 is an exploded view of the cable tensioner according to the first embodiment of this disclosure.
Figure 2:
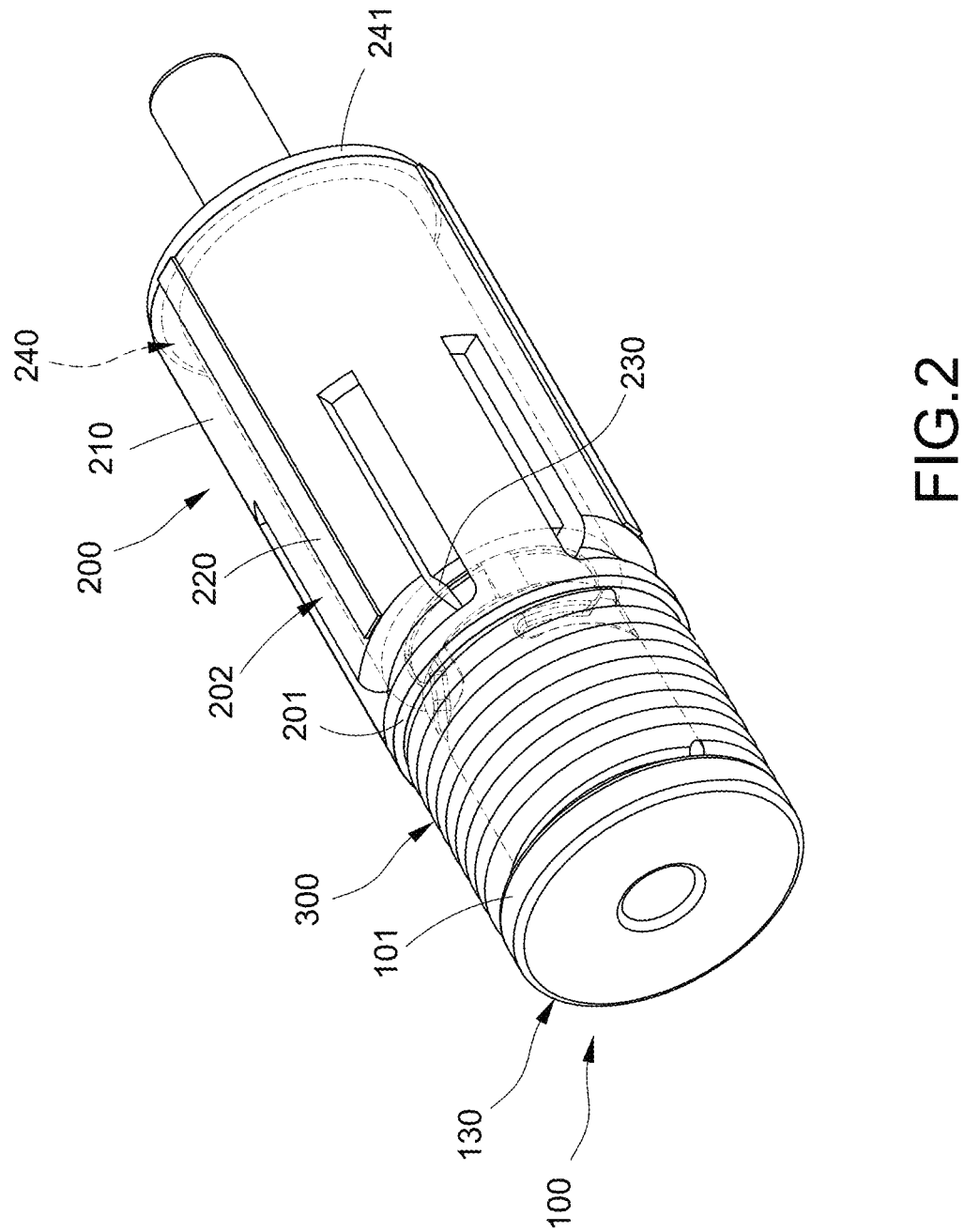
FIG. 2 is a perspective view showing the cable tensioner according to the first embodiment of this disclosure.

According to FIGS. 1 and 2, a cable tensioner is provided in the first embodiment of this disclosure. According to this embodiment, the cable tensioner has a regulating stick 100, a tube assembly 200 and a spring 300.

The regulating stick 100 is provided with a first abutting portion 101 and a ratchet rack 102. According to this embodiment, the regulating stick 100 has one end provided with a protrusion 130, and the first abutting portion 101 is disposed on the protrusion 130. The ratchet rack 102 has a plurality of ratcheting notches 110, each of the ratcheting notches 110 has a stopping surface 111 and a slope 112 disposed therein and opposite to each other, the stopping surface 111 is substantially perpendicular to an axial direction of the regulating stick 100, the slope 112 is inclined relative to the axial direction of the regulating stick 100 with an obtuse exterior angle. According to this embodiment, the ratchet rack 102 is recessed from an external surface of the regulating stick 100, an installation surface 120 is defined on the external surface of the regulating stick 100, the installation surface 120 is parallel to a longitudinal direction of the ratchet rack 102 and extended to beyond two ends of the ratchet rack. Moreover, according to this embodiment, the regulating stick 100 has a plurality of ratchet racks 102 and a plurality of installation surfaces 120, the ratchet racks 102 are serially disposed along a circumferential direction of the regulating stick 100, one of the installation surfaces 120 is disposed between one of the ratchet racks 102 and another of the ratchet racks 102 adjacent thereto.

The tube assembly 200 sleeves the regulating stick 100 and the regulating stick 100 is movable relative to the tube assembly 200. The tube assembly 200 has an outer cylinder 210 and an inner cylinder 240. Specifically, the inner cylinder 240 is disposed in the outer cylinder 210 and the inner cylinder 240 sheathes the regulating stick 100. A second abutting portion 201 is arranged on an external surface of the outer cylinder 210, and a pawl 202 is arranged on the outer cylinder 210. According to this embodiment, the pawl 202 is one-piece formed with the outer cylinder 210, the pawl 202 has an elastic arm 220 and a hook portion 230 arranged on the elastic arm 220.

The spring 300 sleeves the outer cylinder 210 and is clamped between the first abutting portion 101 and the second abutting portion 201 and preloaded.

The regulating stick 100 has a holding slot 103 extended along a circumferential direction of the regulating stick 100, and the outer cylinder 210 has a tenon 211 for snapping into the holding slot 103 to fix the regulating stick 100 and the tube assembly 200 along a longitudinal direction of the tube assembly 200. According to this embodiment, the tenon 211 is a column, the holding slot 103 has an opening 104, the regulating stick 100 and the tube assembly 200 are relatively movable when the regulating stick 100 is rotated to remove the tenon 211 from the holding slot 103 through the opening 104. According to this embodiment, the holding slot 103 has an end disposed with the opening 104. The opening 104 has an opening direction disposed along a longitudinal direction of the regulating stick 100.

Figure 3:
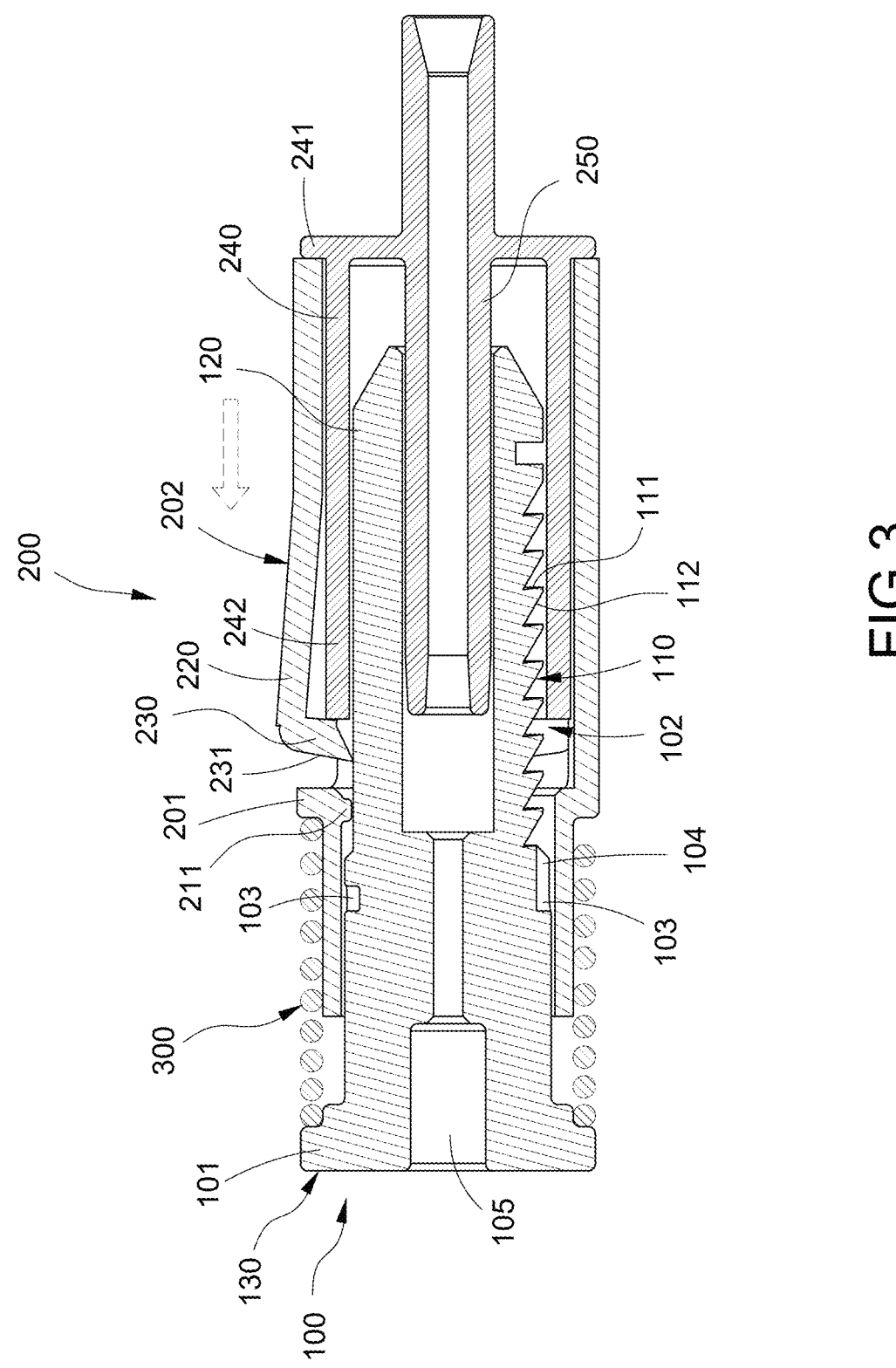
FIGS. 3 to 5 are perspective views showing the cable tensioner which is installed according to the first embodiment of this disclosure.

According to a process of installing the cable tensioner as shown in FIG. 3, the outer cylinder 210 are firstly configured to align the hook portions 230 of the pawls 202 thereon to the corresponding installation surfaces 120 on the regulating stick 100, respectively. Then the outer cylinder 210 is disposed to sleeve the regulating stick 100. While the outer cylinder 210 sleeves the regulating stick 100, the pawl 202 correspondingly abuts against the installation surface 120 and slides on the installation surface 120 until the tenon 211 of the outer cylinder 210 snaps into the holding slot 103 to fix the outer cylinder 210 with the regulating stick 100. The inner cylinder 240 may be pre-assembled to the outer cylinder 210 before sheathing the outer cylinder 210 to the regulating stick 100 or assembled to the outer cylinder 210 after sheathing the outer cylinder 210 to the regulating stick 100.

Figure 4:
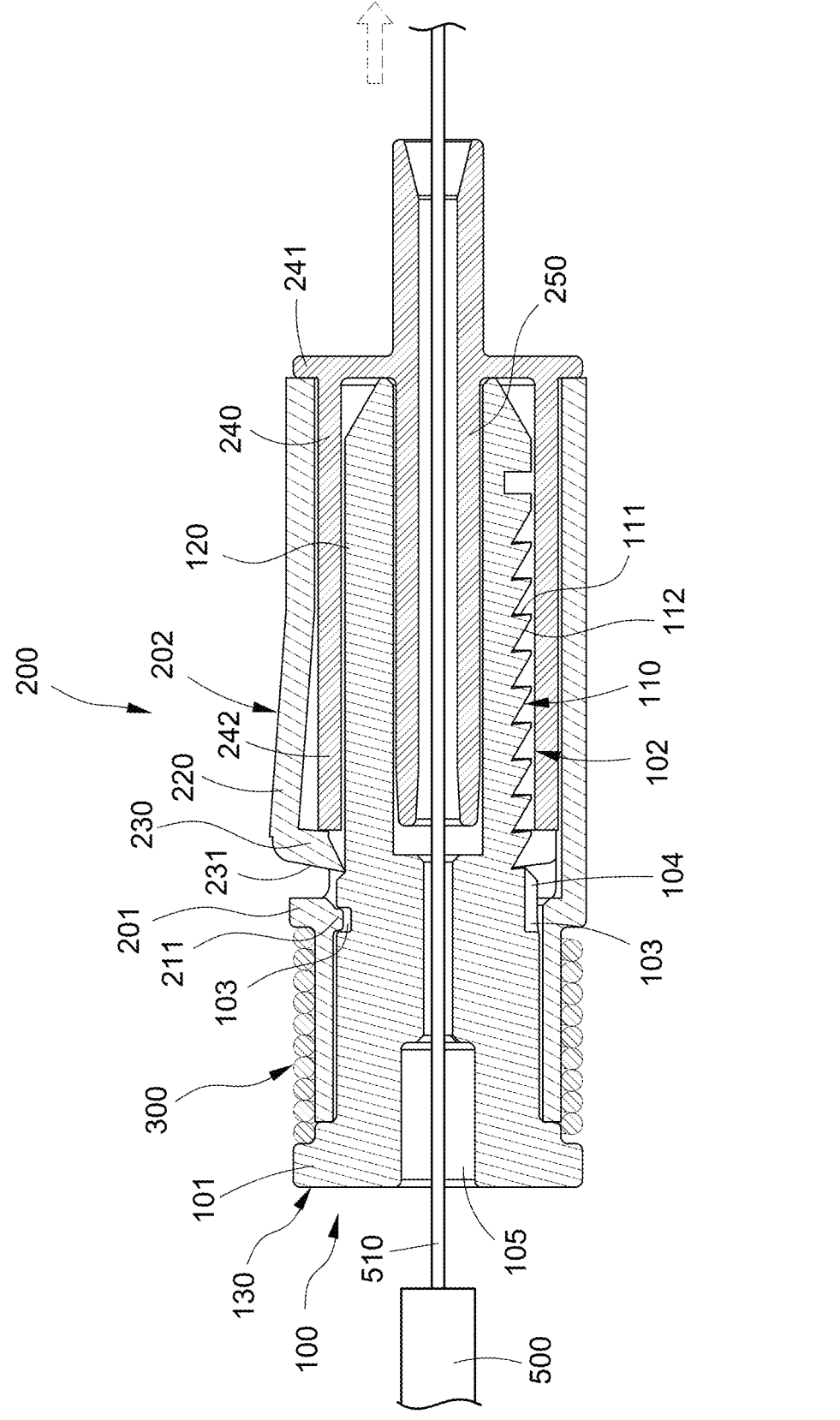

According to FIG. 4, an end of the cable tensioner is connected to the cabling tube 500. Specifically, the cabling tube 500 has an end connected to the regulating stick 100, and the cabling tube 500 is disposed along the longitudinal direction of the regulating stick 100. The regulating stick 100 has an axial socket 105 disposed on the end thereof connected with the cabling tube 500 to allow the cabling tube 500 to be inserted in the axial socket 105. A cable 510 is inserted in the cabling tube 500, the cable 510 is inserted through the cabling tube 500 and then through the regulating stick 100 along and axil direction of the regulating stick 100.

Figure 5:
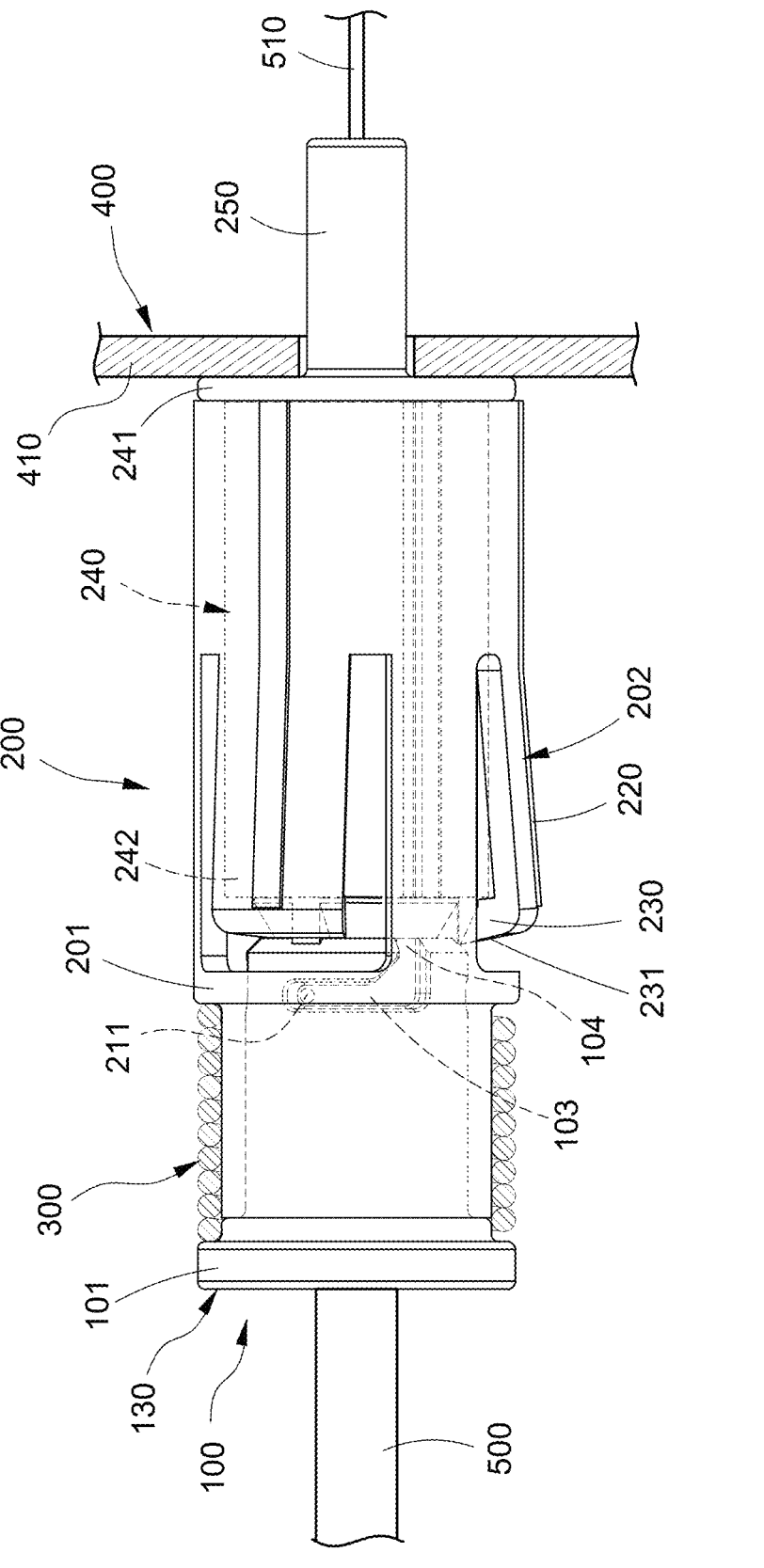

According to FIG. 5, the cable tensioner as shown in this embodiment is disposed between an actuator 400 and a cabling tube 500 for tightening the cable 510 inserted through the actuator 400 and the cabling tube 500. In one embodiment, the actuator may be a cable actuator. The actuator 400 has a housing 410, and a driving hub (not shown in figures) and a motor (not shown in figures) for driving the driving hub to rotate are generally accommodated in the housing 410. At another end of the cable tensioner, the actuator is used for actuating the cable to lift a window panel of a vehicle, and the tube assembly 200 abuts on the housing 410 of the actuator 400. Specifically, the inner cylinder 240 has a bottom end 241 and a top end 242 opposite to the bottom end 241, and the bottom end 242 of the inner cylinder abuts on the housing 410 of the actuator 400. The cable 510 is inserted through the cabling tube 500 and then through the regulating stick 100 along the axil direction of the regulating stick 100, and the cable 510 is further inserted into the housing 410 of the actuator 400 to wire the driving hub. According to this embodiment, the tube assembly 200 may further has a conduit 250, the conduit 250 has an end inserted in the regulating stick 100, and the conduit 250 has another end penetrating the housing 410, the cable 510 is guided by the conduit 250 to be inserted into the housing 410 of the actuator 400. Moreover, the conduit 250 may be one-piece formed with the inner cylinder 240.

Figure 6:
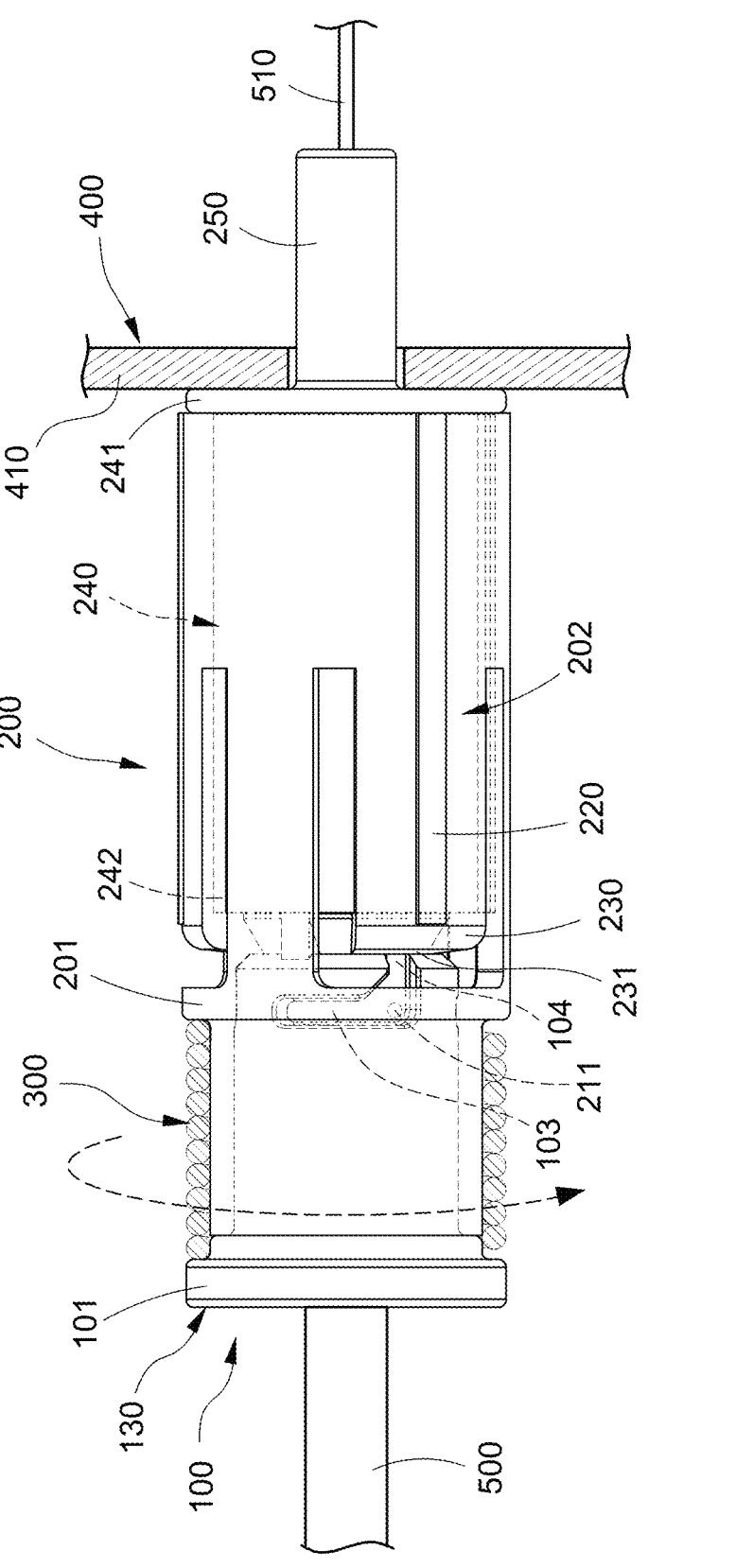
FIGS. 6 to 9 are perspective views showing the cable tensioner in operation according to the first embodiment of this disclosure.

According to FIG. 6, when the regulating stick 100 is rotated to move the tenon 211 to align to the opening 104 of the holding slot 103, the hook portion 230 of the pawl 202 is moved away from the installation surface 120 corresponding thereto to align the ratchet rack 102 correspondingly. The spring 300 is preloaded to provide an elastic force for performing a relative movement between the regulating stick 100 and the tube assembly 200, so that the regulating stick 100 is outstretched from the tube assembly 200.

Figure 7:
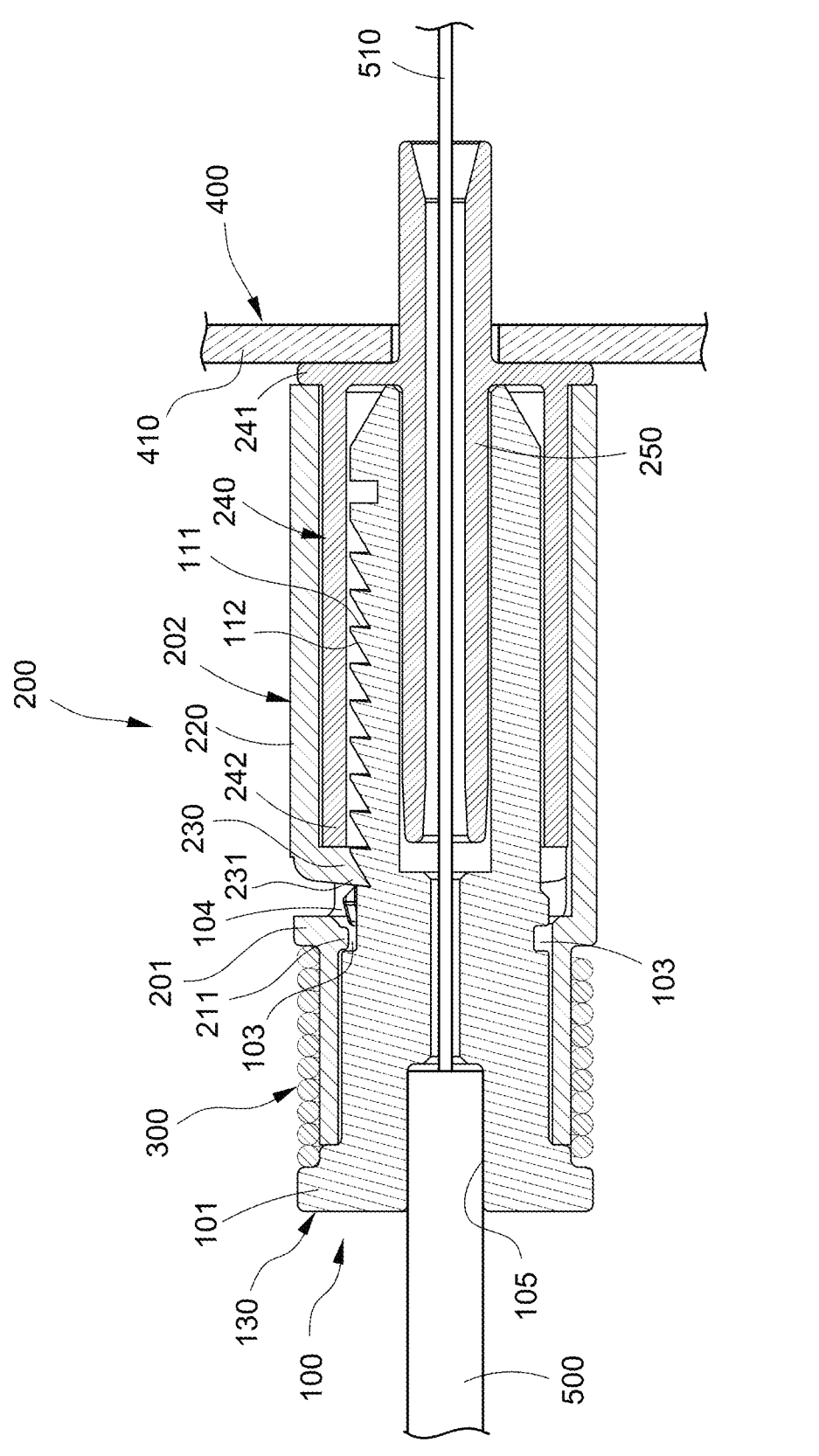

According to FIG. 7, the cable tensioner is released to allow the spring 300 to move the regulating stick 100 out of the outer cylinder 210 along an axial direction of the outer cylinder 210, the tenon 211 is meanwhile released from the holding slot 103 through the opening 104 and the hook portion 230 of the pawl 202 then snaps into the ratchet rack 102 correspondingly. The hook portion 230 may snap in any one of the ratcheting notches 110 during the relative movement between the regulating stick 100 and the tube assembly 200. The hook portion 230 has a stopping side 231, the stopping side 231 abut against the stopping surface 111 to stop the regulating stick 100 from moving into the tube assembly 200, thereby positioning the regulating stick 100 relative to the tube assembly 200. The inner cylinder 240 has a top end 242 abutting against a side of the hook portion 230 opposite to the stopping side 231 for withstanding a force to the hook portion 230 when the hook portion 230 stops the regulating rod 100 from resetting toward to the outer cylinder 210. Accordingly, the hook portion 230 may be maintained at a position in the axial direction of the regulating stick 100 to prevent the elastic arm 220 from breaking caused by overloading.

According to FIG. 1, the outer cylinder 210 of this embodiment has a positioning groove 213 defined on an internal surface thereof, the positioning groove 213 is extended along a direction parallel to a longitudinal direction of the outer cylinder 210, the inner cylinder 240 has a positioning rib 243 defined on an external surface thereof, the positioning rib 243 is extended along a direction parallel to a longitudinal direction of the inner cylinder 240, and the positioning rib 243 is inserted in the positioning groove 213 to avoid a relative rotation outer cylinder 210 and the inner cylinder 240. When the regulating stick 100 is twisted, the bottom end 242 of the inner cylinder 240 abuts against the housing 410 of the actuator 400, thereby fixing the regulating stick 100. The outer cylinder 210 may be further prevented from being driven by the regulating stick 100 via the positioning rib 243 and the positioning groove 213 so as to ensure that the tenon 211 is rotated with the regulating stick 100 and to leave the holding slot 103.

Figure 8:
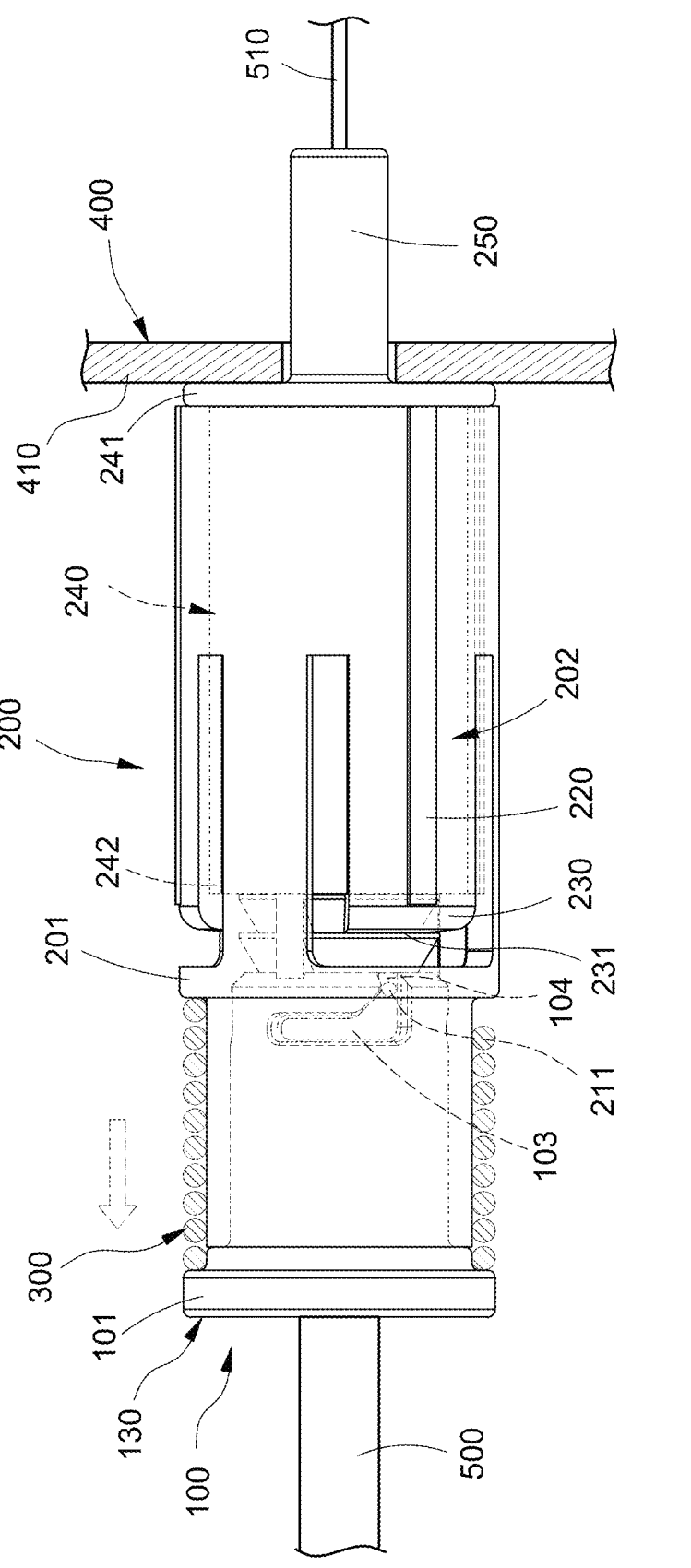
Figure 9:
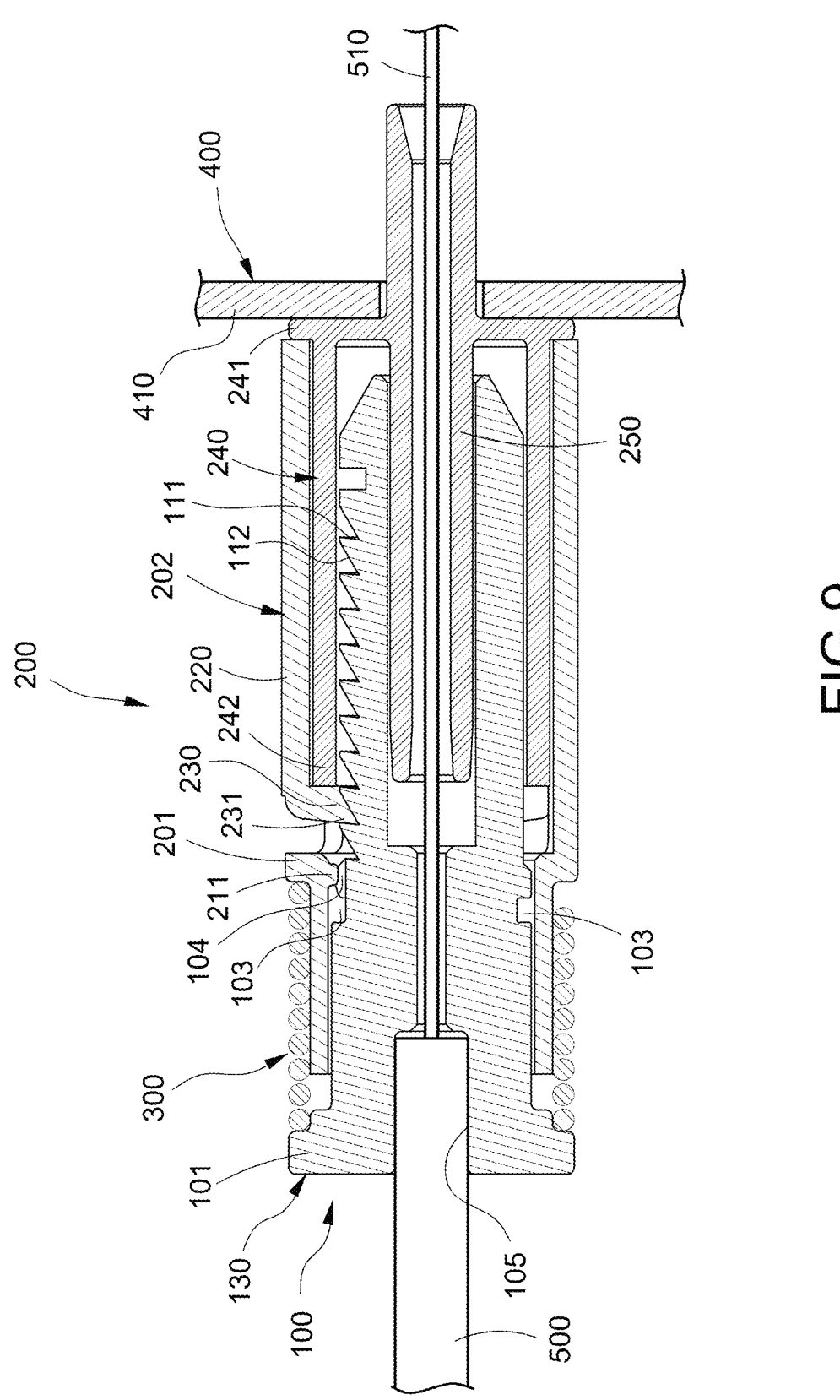

According to FIGS. 8 and 9, when the cable 510 is loose, the spring 300 pushes the regulating stick 100 to stretch from the tube assembly 200, the hook portion 230 snapping on the slope 112 of the ratcheting notch 110 is moved to snap on the stopping surface 111 of another of the ratcheting notches 110, and the stopping side 231 abuts on the stopping surface 111 of the ratcheting notch 110 hooked by the hook portion 230. Accordingly, the relative position between the regulating stick 100 and the outer cylinder 210 is redefined.

Figure 10:
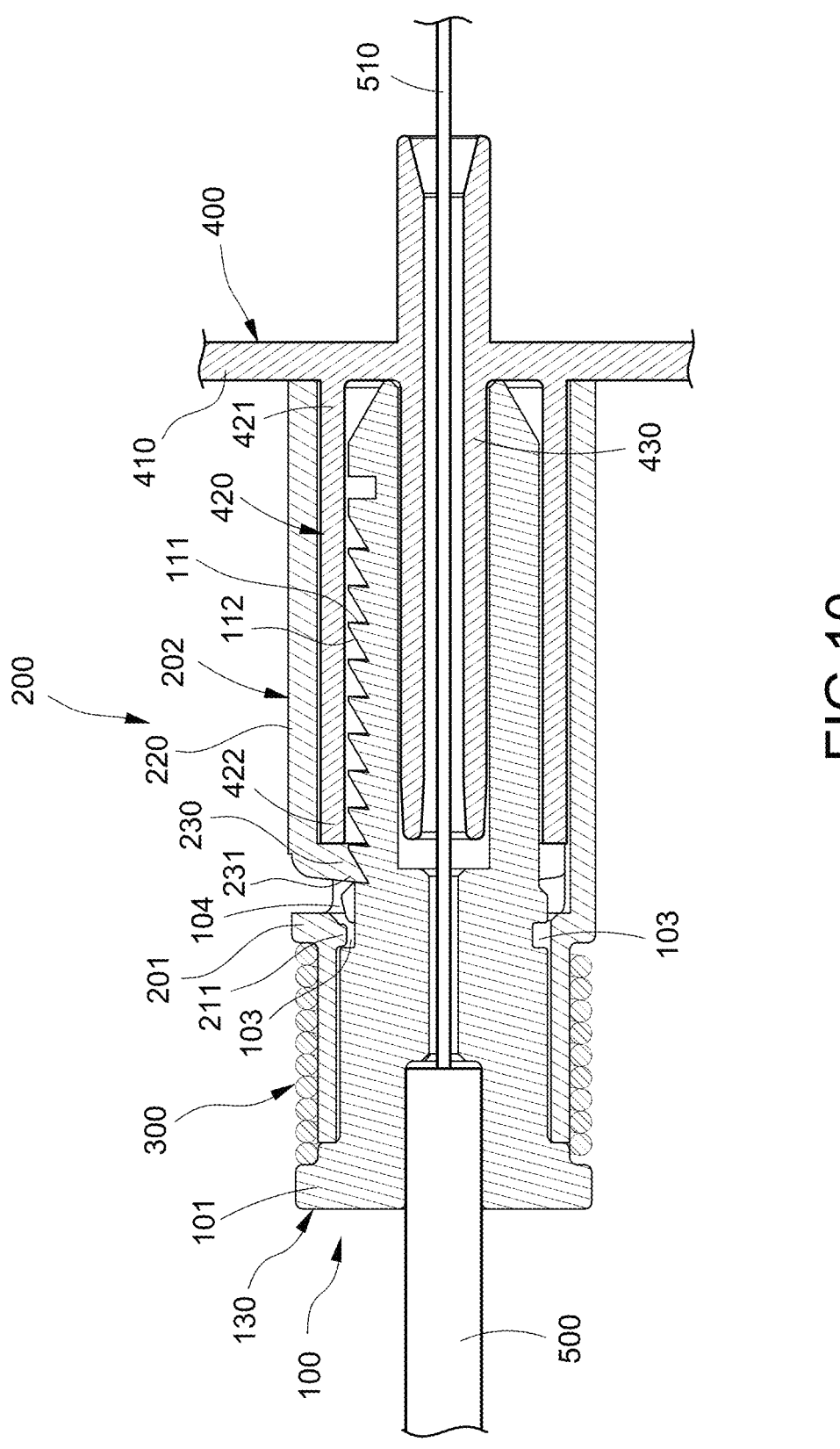
FIG. 10 is a perspective view showing the window lifting device according to the second embodiment of this disclosure.

According to FIG. 10, the second embodiment of this disclosure provides a window lifting device at least having a regulating stick 100, an outer cylinder 210, a spring 300 and an actuator 400. In the window lifting device, the actuator 400 is generally disposed with devices for driving the cable 510, such as a driving hub (not shown in figures) and a motor (not shown in figures) which are cooperate with a slide rail (not shown in the figures) and panel limiters (not shown in figures) for lifting a panel (not shown in figures). According to this embodiment, the regulating stick 100, the outer cylinder 210 and the spring 300 have structures the same as that of the first embodiment, and these will not be repeated in this embodiment.

The regulating stick 100 has one end connected with a cabling tube 500, and the cabling tube 500 is disposed along the longitudinal direction of regulating stick 100. Specifically, the regulating stick 100 has an axial socket 105 disposed on the end thereof connected with the cabling tube 500 to allow the cabling tube 500 to be inserted in the axial socket 105. A cable 510 is inserted in the cabling tube 500, the cable 510 is inserted through the cabling tube 500 and then through the regulating stick 100 along an axil direction of the regulating stick 100.

The outer cylinder 210 sheathes the regulating stick 100, and the regulating stick 100 and the outer cylinder 210 are relatively movable. According to this embodiment, the actuator 400 has a housing 410 and a driving hub (not shown in figures) and a motor (not shown in figures) are generally accommodated in the housing 410. An inner cylinder 420 is arranged to stand on an external surface of the housing 410. According to this embodiment, the inner cylinder 420 is one-piece formed with the housing 410. The outer cylinder 210 abuts against the housing 410 of the actuator 400, the inner cylinder 420 is inserted in the outer cylinder 210, and the inner cylinder 420 sheaths the regulating stick 100. The cable 510 is inserted through the regulating stick 100 and then inserted in the housing 410 of the actuator 400 to wind the driving hub. According to this embodiment, a conduit 430 is arranged to stand on an external surface of the housing 410, and the conduit 430 is disposed in the inner cylinder 420 and coaxial with the inner cylinder 420. The conduit 250 has an end inserted in the regulating stick 100, and the conduit 250 has another end penetrating the housing 410, the cable 510 is guided by the conduit 250 to be inserted into the housing 410 of the actuator 400. A pawl 202 is arranged on the outer cylinder 210, the pawl 202 has an elastic arm 220 and a hook portion 230 arranged on the elastic arm 220. The hook portion 230 may snap in any one of the ratcheting notches 110 during the relative movement between the regulating stick 100 and the outer cylinder 210. The hook portion 230 has a stopping side 231, the stopping side 231 abut against the stopping surface 111 to stop the regulating stick 100 from moving into the outer cylinder 210, thereby positioning the regulating stick 100 relative to the outer cylinder 210.

The spring 300 sheaths the outer cylinder 210 and the spring 300 is clamped between a structure of the regulating stick 100 and a structure of the outer cylinder 210 with preload. The spring 300 is preloaded to provide an elastic force for performing a relative movement between the regulating stick 100 and outer cylinder 210, so that the regulating stick 100 is outstretched from the outer cylinder 210. When the regulating stick 100 is outstretched from the outer cylinder 210, the hook portion 230 snapping on the slope 112 of the ratcheting notch 110 is moved to snap on the stopping surface 111 of another of the ratcheting notches 110, and the stopping side 231 abuts on the stopping surface 111 of the ratcheting notch 110 hooked by the hook portion 230. Accordingly, the relative position between the regulating stick 100 and the outer cylinder 210 is re-fixed. The inner cylinder 240 has a bottom end 241 and a top end 242 opposite to the bottom end 241. The inner cylinder 240 has a top end 242 abutting against a side of the hook portion 230 opposite to the stopping side 231 for withstanding a force to the hook portion 230 when the hook portion 230 stops the regulating rod 100 from resetting toward to the outer cylinder 210. Accordingly, the hook portion 230 may be maintained at a position in the axial direction of the regulating stick 100 to prevent the elastic arm 220 from breaking caused by overloading.

Figure 11:
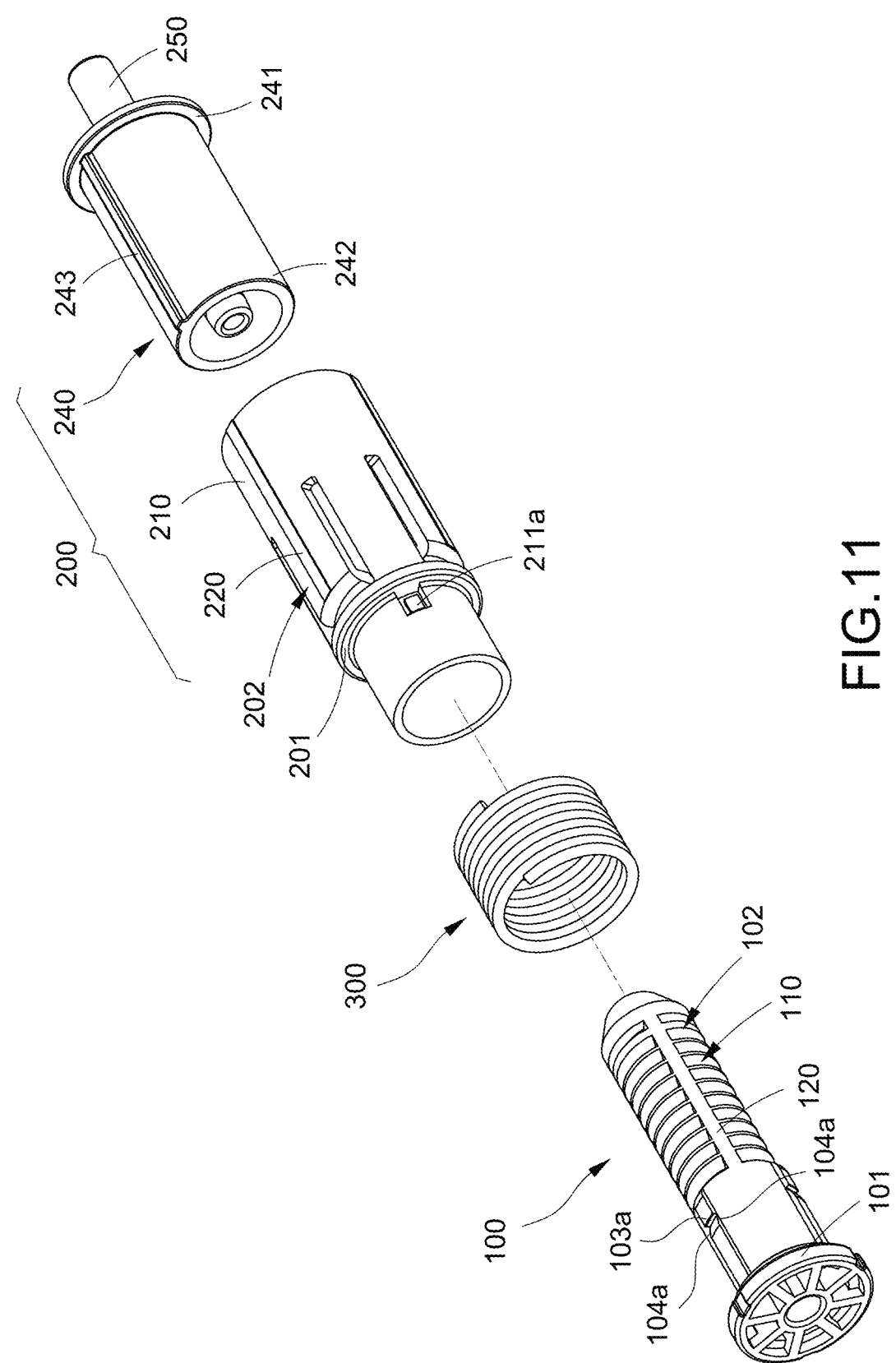
FIG. 11 is an exploded view showing the window lifting device according to the third embodiment of this disclosure.
Figure 12:
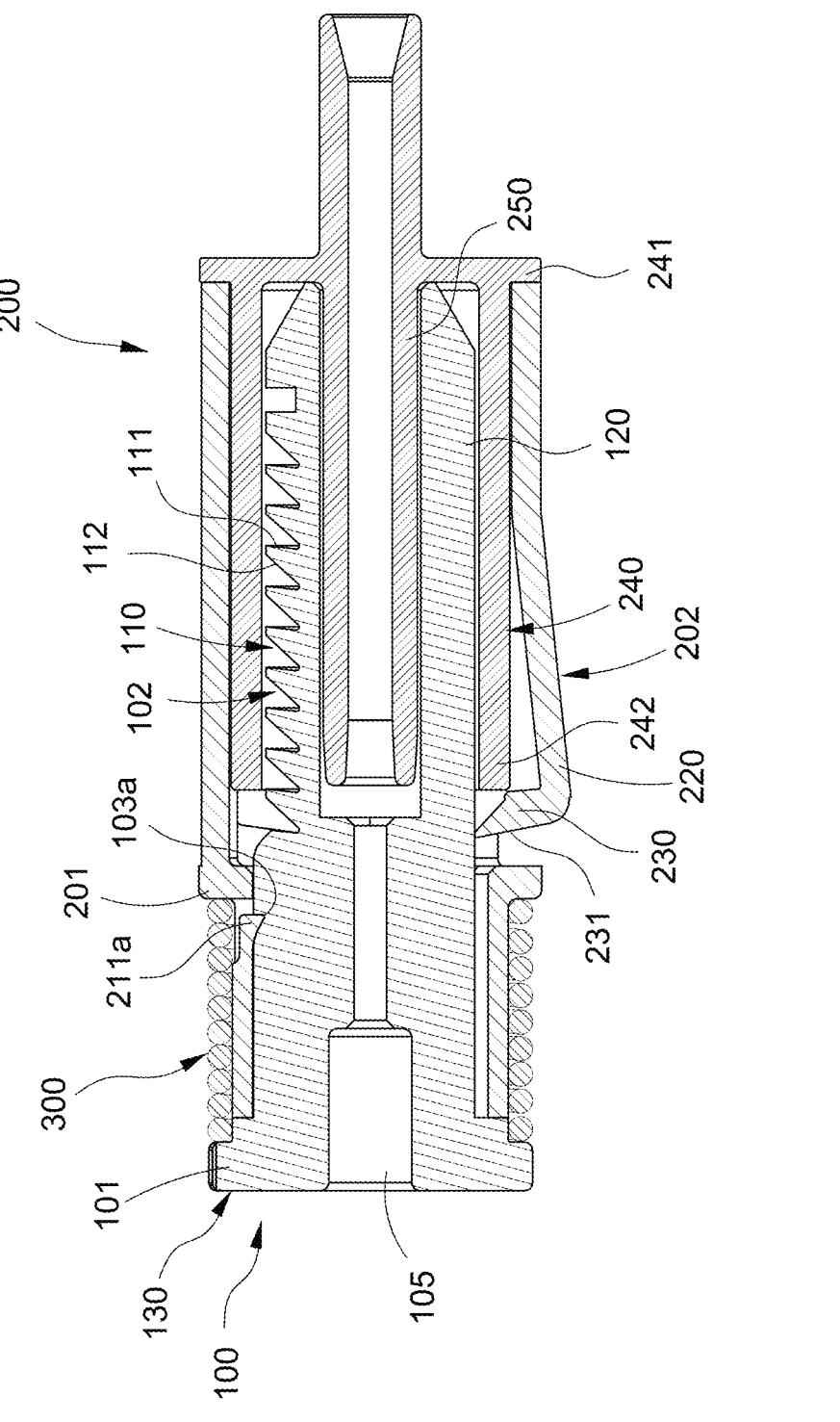
FIG. 12 is a cross-sectional view in a longitudinal direction of the cable tensioner according to the third embodiment of this disclosure.

According to FIGS. 11 and 12, the third embodiment of this disclosure provides a cable tensioner. According to this embodiment, the cable tensioner has a regulating stick 100, a tube assembly 200 and a spring 300. The regulating stick 100, the outer cylinder 210 and the spring 300 have structures the same as that of the first embodiment, and these will not be repeated in this embodiment. According to this embodiment, the regulating stick 100 has a holding slot 103*a* extended along a circumferential direction of the regulating stick 100, and the outer cylinder 210 has a tenon 211*a* for snapping into the holding slot 103*a* to fix the regulating stick 100 and the tube assembly 200 along a longitudinal direction of the tube assembly 200. According to this embodiment, the tenon 211*a* is a latch, the holding slot 103*a* has an opening 104*a*, the opening 104*a* is disposed at one end of the holding slot 103*a*, the opening 104*a* has an opening direction along a circumferential direction of the regulating stick 100. The regulating stick 100 is movable relative to the tube assembly 200 when the tenon 211*a* is released from the holding slot 103*a* through the opening 104*a*. According to this embodiment, the holding slot 103*a* is provided with openings 104*a* at two ends thereof, and the regulating stick 100 may be released by twisting the regulating stick 100 along clockwise or counterclockwise direction.

Furthermore, according to the cable tensioner of the present disclosure, the outer cylinder 210 may be temporarily buckled at a temporary position by twisting the regulating stick 100 an angle to latch the tenon 211*a* in the holding slot 103*a* when the regulating stick 100 and the spring 300 are installed in the outer cylinder 210. The regulating stick 100 may be further twisted after a wiring process so as to release the tenon 211*a* from the holding slot 103*a* and allow the outer cylinder 210 to leave the temporary position, so that the cable may be tighten by the cable tensioner when loose.

According to this embodiment, the inner cylinder 240 has a positioning rib 243 arranged on an external surface thereof, the positioning groove 213 is extended along a direction parallel to a longitudinal direction of the outer cylinder 210, and the positioning rib 243 snaps on an internal surface of the outer cylinder 210 to avoid a relative rotation between outer cylinder 210 and the inner cylinder 240. When the regulating stick 100 is twisted, the bottom end 242 of the inner cylinder 240 abuts against the housing 410 of the actuator 400, thereby fixing the regulating stick 100. The outer cylinder 210 may be further prevented from being driven by the regulating stick 100 via the positioning rib 243 and the positioning groove 213 so as to ensure that the tenon 211 is rotated with the regulating stick 100 and to leave the holding slot 103.

According to the cable tensioner and the window lifting device of this disclosure, the regulating rod 100 may be operated to cooperate with the outer cylinder 210 for relative extension or contraction to tighten the cable 510. A pawl 202 is arranged on the outer cylinder 210 for snapping on the ratchet rack 102 of the regulating stick 100 and the outer cylinder 210, the outer cylinder 210 is provided with the inner cylinder 240 disposed therein for supporting the pawl 202 so at to prevent the pawl 202 from break caused by a force from the tightened cable 510.

The regulating stick 100 is provided with the holding slot 103 disposed along the circumferential direction thereof to be operated with the tenon 211 of the outer cylinder 210 so that the regulating stick 100 and the outer cylinder 210 are axially fixed to avoid motion. Moreover, the tenon 211 may be released from the holding slot 103 through the opening 104 of the holding slot 103 by twisting the outer cylinder 210 so as to allow a motion for installation.

While this disclosure has been described by means of specific embodiments, numerous modifications and variations could be made thereto by those skilled in the art without departing from the scope and spirit of this disclosure set forth in the claims.

What is claimed is:

1. A cable tensioner, comprising:
   a regulating stick, comprising a first abutting portion and a ratchet rack, the ratchet rack comprising a plurality of ratcheting notches, and each of the ratcheting notches comprising a stopping surface and a slope disposed therein and opposite to each other;

a tube assembly, sleeving the regulating stick and comprising an outer cylinder and an inner cylinder disposed in the outer cylinder, a second abutting portion arranged on an external surface of the outer cylinder, a pawl arranged on the outer cylinder, the pawl comprising an elastic arm and a hook portion arranged on the elastic arm, the hook portion comprising a stopping side, the stopping side abutting against the stopping surface, and the hook portion snap-fitting one of the ratcheting notches; and a spring, sleeving the outer cylinder and clamped between the first abutting portion and the second abutting portion and preloaded, wherein the hook portion snap-fitting on the slope of one of the ratcheting notches is moved to snap-fit on the stopping surface of another of the ratcheting notches via the stopping side when the regulating stick is out stretched from the tube assembly, and the inner cylinder comprises an end abutting against a side of the hook portion opposite to the stopping side;

wherein the regulating stick comprises a holding slot extended along a circumferential direction of the regulating stick, and the outer cylinder comprises a tenon for snap-fitting into the holding slot to fix the regulating stick and the tube assembly along a longitudinal direction of the tube assembly;

wherein the holding slot comprises an opening, and the regulating stick and the tube assembly are relatively movable when the tenon leaves the holding slot through the opening;

wherein the opening comprises an opening direction disposed along a longitudinal direction of the regulating stick.

2. The cable tensioner according to claim 1, wherein the holding slot comprises an end disposed with the opening.

3. The cable tensioner according to claim 1, wherein the opening comprises an opening direction disposed along the circumferential direction of the regulating stick.

4. The cable tensioner according to claim 1, wherein the inner cylinder sleeves the regulating stick.

5. The cable tensioner according to claim 1, wherein the ratchet rack is recessed from an external surface of the regulating stick, an installation surface is defined on the external surface of the regulating stick, and the installation surface is parallel to a longitudinal direction of the ratchet rack and extended to beyond two ends of the ratchet rack.

6. The cable tensioner according to claim 5, wherein the regulating stick comprises a plurality of ratchet racks and a plurality of installation surfaces, the ratchet racks are serially disposed along a circumferential direction of the regulating stick, wherein one of the installation surfaces is disposed between one of the ratchet racks and another of the ratchet racks adjacent thereto.

7. The cable tensioner according to claim 1, wherein the pawl is one-piece formed with the outer cylinder.

8. The cable tensioner according to claim 1, wherein the regulating stick comprises an end provided with a protrusion, and the first abutting portion is disposed on the protrusion.

9. A window lifting device, comprising:

a regulating stick, comprising a first abutting portion and a ratchet rack, the ratchet rack comprising a plurality of ratcheting notches, and each of the ratcheting notches comprising a stopping surface and a slope disposed therein and opposite to each other;

an outer cylinder, sheathing the regulating stick, comprising a second abutting portion arranged on an external surface of the outer cylinder, a pawl comprising an elastic arm and a hook portion arranged on the elastic arm, the hook portion comprising a stopping side, the stopping side abutting against the stopping surface, and the hook portion snap-fitting one of the ratcheting notches;

a spring, sheathing the outer cylinder and clamped between the first abutting portion and second abutting portion and preloaded; and an actuator, comprising a housing, the housing comprising an inner cylinder, and the inner cylinder inserted in the outer cylinder, wherein the hook portion snap-fitting on the slope of one of the ratcheting notches is moved to snap-fit on the stopping surface of another of the ratcheting notches via the stopping side when the regulating stick is stretched out of the outer cylinder, and the inner cylinder comprises an end abutting against a side of the hook portion opposite to the stopping side.

10. The window lifting device according to claim 9, wherein the regulating stick comprises a holding slot extended along a circumferential direction of the regulating stick, and the outer cylinder comprises a tenon for snap-fitting into the holding slot to fix the regulating stick and the tube assembly along a longitudinal direction of the tube assembly.

11. The window lifting device according to claim 10, wherein the holding slot comprises an opening, and the regulating stick and the tube assembly are relatively movable when the tenon leaves the holding slot through the opening.

12. The window lifting device according to claim 11, wherein the holding slot comprises an end disposed with the opening.

13. The window lifting device according to claim 11, wherein the opening comprises an opening direction disposed along a longitudinal direction of the regulating stick.

14. The window lifting device according to claim 11, wherein the opening comprises an opening direction disposed along the circumferential direction of the regulating stick.

15. The window lifting device according to claim 9, wherein the inner cylinder sleeves the regulating stick.

16. The window lifting device according to claim 9, wherein the ratchet rack is recessed from an external surface of the regulating stick, an installation surface is defined on the external surface of the regulating stick, and the installation surface is parallel to a longitudinal direction of the ratchet rack and extended to beyond two ends of the ratchet rack.

17. The window lifting device according to claim 16, wherein the regulating stick comprises a plurality of ratchet racks and a plurality of installation surfaces, the ratchet racks are serially disposed along a circumferential direction of the regulating stick, wherein one of the installation surfaces is disposed between one of the ratchet racks and another of the ratchet racks adjacent thereto.

18. The window lifting device according to claim 9, wherein the pawl is one-piece formed with the outer cylinder as one piece.

19. The window lifting device according to claim 9, wherein the regulating stick comprises an end provided with a protrusion, and the first abutting portion is disposed on the protrusion.

20. The window lifting device according to claim 9, wherein the inner cylinder is integrally formed on the housing as one piece.

* * * * *